United States Patent
Ravi

(10) Patent No.: US 10,973,060 B2
(45) Date of Patent: Apr. 6, 2021

(54) METHODS AND SYSTEMS FOR MANAGEMENT OF AN ASSOCIATION BETWEEN A USER AND A VEHICLE

(71) Applicant: HONDA MOTOR CO., LTD., Tokyo (JP)

(72) Inventor: Narendran Ravi, Torrance, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 350 days.

(21) Appl. No.: 15/897,705

(22) Filed: Feb. 15, 2018

(65) Prior Publication Data
US 2019/0254084 A1    Aug. 15, 2019

(51) Int. Cl.
| | |
|---|---|
| H04W 76/10 | (2018.01) |
| H04W 4/40 | (2018.01) |
| H04L 29/08 | (2006.01) |
| G06F 9/445 | (2018.01) |
| G06F 21/35 | (2013.01) |
| G06F 21/31 | (2013.01) |
| H04W 76/11 | (2018.01) |

(52) U.S. Cl.
CPC ............ *H04W 76/10* (2018.02); *G06F 9/445* (2013.01); *G06F 21/31* (2013.01); *G06F 21/35* (2013.01); *H04L 67/26* (2013.01); *H04W 4/40* (2018.02); *H04L 67/12* (2013.01); *H04L 67/34* (2013.01); *H04W 76/11* (2018.02)

(58) Field of Classification Search
CPC ....... H04W 76/10; H04W 4/40; H04W 76/11; G06F 9/445; G06F 21/35; G06F 21/31; H04L 67/12; H04L 67/34; H04L 67/26
See application file for complete search history.

(56) References Cited

U.S. PATENT DOCUMENTS

| | | | | |
|---|---|---|---|---|
| 9,728,019 | B2* | 8/2017 | Lee | B60R 25/2018 |
| 9,736,656 | B1* | 8/2017 | Camacho | H04W 12/06 |
| 10,200,364 | B1* | 2/2019 | Ketharaju | H04W 12/66 |
| 2008/0269961 | A1* | 10/2008 | Shitanaka | B60R 25/2081 |
| | | | | 701/2 |

(Continued)

OTHER PUBLICATIONS

Busold, C., et. al. "Smart Keys for Cyber-Cars: Secure Smartphone-Based NFC Enabled Car Immobilizer," ACM Conference, pp. 233-242, 2013.

(Continued)

*Primary Examiner* — Sze-Hon Kong
(74) *Attorney, Agent, or Firm* — Arent Fox LLP; Mark Duell

(57) ABSTRACT

Methods and systems for vehicle—user association management. The methods and systems may include receiving identification data corresponding to a user and transmitting the identification data to a server. The identification data is compared to previously stored data in a memory of the server, and when the identification data matches previously stored data, transmitting a notification to a mobile device of the user, and when the identification data does not match previously stored data, transmitting a message based on the identification data, prompting the user to complete a registration with the server. The methods and systems may further include establishing the association between the user and the vehicle based on at least one of the notification and the registration.

17 Claims, 6 Drawing Sheets

(56) References Cited

U.S. PATENT DOCUMENTS

| | | | | |
|---|---|---|---|---|
| 2009/0306834 | A1* | 12/2009 | Hjelm | H04L 12/2809 701/1 |
| 2010/0251352 | A1* | 9/2010 | Zarchy | G06F 21/10 726/9 |
| 2012/0313796 | A1* | 12/2012 | Lee | G07C 9/00309 340/989 |
| 2013/0006674 | A1* | 1/2013 | Bowne | G07C 5/0858 705/4 |
| 2013/0046510 | A1* | 2/2013 | Bowne | G06Q 10/0639 702/187 |
| 2016/0189115 | A1* | 6/2016 | Cattone | G06Q 30/0633 705/26.8 |
| 2016/0352673 | A1* | 12/2016 | Flores | H04L 67/306 |
| 2017/0012989 | A1* | 1/2017 | Ritter | H04L 63/102 |
| 2017/0039568 | A1* | 2/2017 | Tunnell | G06F 21/33 |
| 2017/0080949 | A1* | 3/2017 | Sinaguinan | G06F 9/4451 |
| 2017/0118178 | A1 | 4/2017 | Fruehling et al. | |
| 2017/0178035 | A1* | 6/2017 | Grimm | G06Q 10/02 |
| 2017/0195325 | A1 | 7/2017 | Yamamoto | |
| 2017/0197631 | A1* | 7/2017 | Sinaguinan | B60W 40/08 |
| 2017/0238174 | A1* | 8/2017 | Cech | H04W 12/0609 455/411 |
| 2017/0253216 | A1* | 9/2017 | Nishidai | B60R 25/01 |
| 2017/0323639 | A1* | 11/2017 | Tzirkel-Hancock | H04R 5/023 |
| 2018/0089859 | A1* | 3/2018 | Lindemann | G06T 11/00 |
| 2018/0115546 | A1* | 4/2018 | Ito | H04L 63/06 |
| 2018/0144322 | A1* | 5/2018 | Unnerstall | G06Q 20/18 |
| 2018/0174376 | A1* | 6/2018 | Avary | G11C 7/20 |
| 2018/0285846 | A1* | 10/2018 | Oesterling | G06Q 20/145 |
| 2018/0354460 | A1* | 12/2018 | Bartels | G07C 9/00896 |
| 2018/0370486 | A1* | 12/2018 | Chin | H04W 12/069 |
| 2018/0375855 | A1* | 12/2018 | Karaila | H04L 63/0853 |
| 2019/0028443 | A1* | 1/2019 | Chin | G07C 9/00571 |
| 2019/0058728 | A1* | 2/2019 | Datta | H04L 63/20 |
| 2019/0066424 | A1* | 2/2019 | Hassani | B60R 25/04 |
| 2019/0122470 | A1* | 4/2019 | Endo | B60R 25/2018 |
| 2019/0126934 | A1* | 5/2019 | Wellborn | G06Q 10/02 |
| 2019/0138985 | A1* | 5/2019 | Endo | G06Q 10/0833 |
| 2019/0149956 | A1* | 5/2019 | Chiang | H04W 60/00 701/36 |
| 2019/0200183 | A1* | 6/2019 | Endo | G06Q 10/0833 |
| 2019/0206149 | A1* | 7/2019 | Sakurada | G07C 5/0808 |
| 2019/0268332 | A1* | 8/2019 | Wang | H04L 9/3231 |
| 2020/0134626 | A1* | 4/2020 | Abouelenin | G06Q 20/4014 |
| 2020/0201959 | A1* | 6/2020 | Takemori | H04L 9/0863 |
| 2020/0398692 | A1* | 12/2020 | Zu | B60L 53/16 |
| 2021/0036856 | A1* | 2/2021 | Wang | H04L 29/06 |

OTHER PUBLICATIONS

Symeonidis, I., et al., "Sepcar: A Secure and Privacy-Enhancing Protocal for Car Access Provision," European Symposium on Research in Computer Security, pp. 475-493, 2017.

* cited by examiner

US 10,973,060 B2

METHODS AND SYSTEMS FOR MANAGEMENT OF AN ASSOCIATION BETWEEN A USER AND A VEHICLE

TECHNICAL FIELD

The present disclosure relates to methods and systems for vehicle—user association management.

BACKGROUND

As vehicles advance in technology, many include additional options and settings that are available only to specific users of the vehicle. These additional options and settings require associating a wireless device of a specific user to the vehicle. Some of these additional options and settings may include features such as remote start, personalized settings, telephone contact list, remote unlock/lock, and tracking, among other features. Typically, the association between the wireless device of the specific user and the vehicle is set-up and authorized through a complex process, including steps such as contacting a call center of the manufacturer of the vehicle, accessing a personal computer to enroll, logging-in with credentials, providing vehicle identification number ("VIN"), providing personal information to a salesman of the vehicle, and the like. There is a need in the art, therefore, for methods and systems for managing associations between vehicle and user such that the steps required to initialize, set-up and manage the association are simpler and/or minimized.

SUMMARY

The following presents a summary of one or more aspects of the disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the disclosure in a simplified form as a prelude to the more detailed description that is presented later.

In an example, a method is provided for establishing an association between a user and a vehicle. The method includes receiving identification data corresponding to the user and transmitting the identification data to a server, wherein the identification data is compared to previously stored data in a memory of the server. In addition, when the identification data matches previously stored data, transmitting a notification to a mobile device of the user; and when the identification data does not match previously stored data, transmitting a message based on the identification data, wherein the message prompts the user to complete a registration with the server. Further, the method establishes the association between the user and the vehicle based on at least one of the notification and the registration.

In another example, a system is provided that includes that includes a memory and a processor coupled to the memory. In addition, the system receives identification data corresponding to the user and transmits the identification data to a server. In addition the identification data is compared to previously stored data in a memory of the server and when the identification data matches previously stored data, transmit a notification to a mobile device of the user, and when the identification data does not match previously stored data, transmit a message based on the identification data. In addition, the message prompts the user to complete a registration with the server. In addition, the system establishes an association between the user and a vehicle based on at least one of the notification and the registration.

In a further example, a non-transitory computer-readable medium storing computer executable code is provided for receiving identification data corresponding to the user and transmitting the identification data to a server. In addition, the identification data is compared to previously stored data in a memory of the server and when the identification data matches previously stored data, transmit a notification to a mobile device of the user, and when the identification data does not match previously stored data, transmit a message based on the identification data, wherein the message prompts the user to complete a registration with the server. In addition, In addition, the non-transitory computer-readable medium storing computer executable code is provided for establishing the association between the user and the vehicle based on at least one of the notification and the registration.

To the accomplishment of the foregoing and related ends, the one or more aspects of the disclosure comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The novel features believed to be characteristic of aspects described herein are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

The disclosed vehicle and user association management system and method may allow a new user of a vehicle to conveniently establish an association between a wireless device of the user and the vehicle. Instead of having to confirm ownership of the vehicle, confirm ownership of the wireless device and provide identifying information to a third party for setting up the association, the user may establish an association between the wireless device and the vehicle by providing personal information directly to the vehicle. Accordingly, the user, who already has access to the vehicle and the user's wireless device, may confirm the association, and thereby be provided with access to additional options and customization features of the vehicle. Additionally, there is no need for the user to contact a third party to verify additional information.

Figure 1:
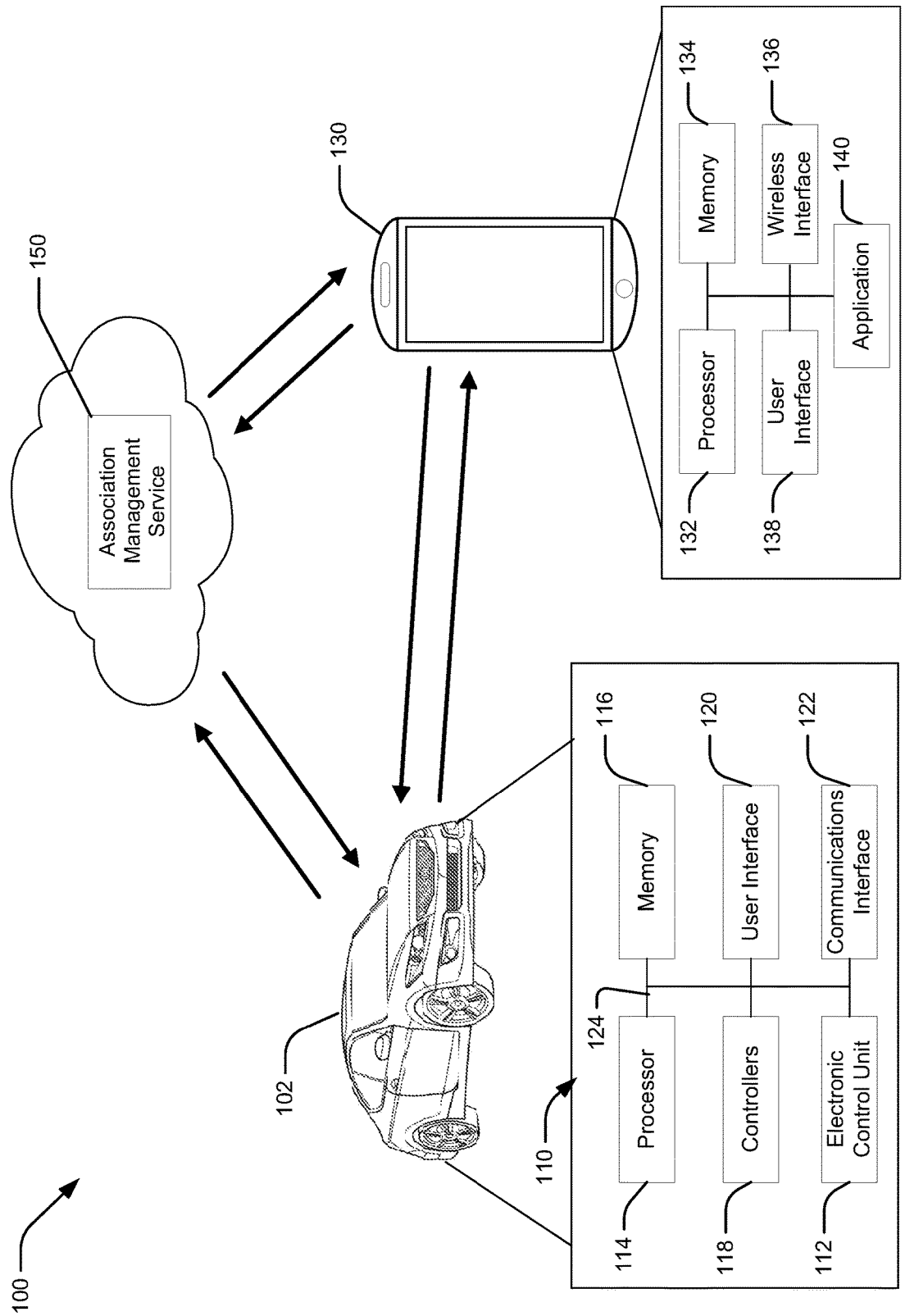
FIG. 1 illustrates a schematic view of an example operating environment of a vehicle and user association management system according to one aspect of the disclosure.

Turning to FIG. 1, a schematic view of an example operating environment 100 of a vehicle and user association management system 110 and example methods according to an aspect of the disclosure is provided. The vehicle and user association management system 110 may reside within a vehicle 102. The vehicle 102 and/or vehicle and user association management system 110 may communicate with a wireless device 130 and/or an association management service 150. In an aspect, the wireless device 130 may include any device capable of wireless communication with the vehicle and user association management system 110 such as, but not limited to devices such as a cellular phone, a smart phone, a session initiation protocol (SIP) phone, a laptop, a tablet, a personal digital assistant (PDA), a satellite radio, a global positioning system, a multimedia device, a video device, a digital audio player (e.g., MP3 player), a camera, a game console, a tablet, a smart device, a wearable device, or any other similar functioning device, among other devices.

In an aspect, the term "vehicle" may include, but is not limited to: cars, trucks, vans, minivans, SUVs, motorcycles, scooters, boats, personal watercraft, and aircraft. The term "electronic vehicle," as used herein, may refer to any moving vehicle that is capable of carrying one or more human occupants and is powered by an electronic battery and/or any form of energy that may be recharged at a charging station.

In an aspect, the association management service 150 may be an online service that provides association information regarding a wireless device, a user and a vehicle. In an aspect, the association management service 150 may be a cloud service hosted by one or more computer servers or virtual servers. The components of the vehicle and user association management system 110, as well as the components of other systems (e.g., wireless device 130 and association management service 150), hardware architectures, and software architectures discussed herein, may be combined, omitted or organized into various implementations.

Vehicle 102 may generally include an electronic control unit (ECU) 112 that operably controls a plurality of vehicle systems. The vehicle systems may include, but are not limited to, the vehicle and user association management system 110, vehicle HVAC systems, vehicle audio systems, vehicle video systems, vehicle infotainment systems, and vehicle telephone systems, among others. The various vehicle systems may be associated with one or more controllers 118 for controlling the vehicle systems. In some variations, the one or more controllers 118 control the vehicle systems via the ECU 112. The vehicle and user association management system 110 may also include a processor 114 and a memory 116 that communicate with the ECU 112, controllers 118, a user interface 120 and a communications interface 122 via a bus 124.

The term "processor," as used herein, may refer to a device that processes signals and performs general computing and arithmetic functions. Signals processed by the processor may include digital signals, data signals, computer instructions, processor instructions, messages, a bit, a bit stream, or other computing that may be received, transmitted and/or detected. A processor may include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described herein.

The term "memory," as used herein, may include volatile memory and/or nonvolatile memory. Non-volatile memory may include ROM (read only memory), PROM (programmable read only memory), EPROM (erasable PROM) and EEPROM (electrically erasable PROM). Volatile memory may include RAM (random access memory), synchronous RAM (SRAM), dynamic RAM (DRAM), synchronous DRAM (SDRAM), double data rate SDRAM (DDR SDRAM), and direct RAM bus RAM (DRRAM).

The ECU 112 may include internal processing memory, an interface circuit, and bus lines for transferring data, sending commands, and communicating with the vehicle systems. The term "bus," as used herein, may refer to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols such as Controller Area network (MAY), Local Interconnect Network (LIN), among others. The ECU 112 may include an internal processor and memory, not shown. The vehicle 102 may also include the bus 124 for sending data internally among the various components of the vehicle and user association management system 110.

The controllers 118 may include any controls by which the user interacts with the vehicle 102. Example controllers may include buttons, switches, knobs, dials, wheels, pedals, the steering wheel, and gear selector. The controllers may also include external devices such as remote entry buttons or key fobs, or a receiver for communication with such external devices. In an aspect, the controllers 118 are associated with a customizable feature. In another aspect, a window control switch may be associated with a window control feature having customizable options for window opening speed and/or intermediate stop positions. In one aspect, a receiver for a remote entry key fob may be linked to a remote entry feature having customizable options for which doors are unlocked by the remote entry key fob. In another aspect, seat control buttons may be linked to a seat adjustment feature having customizable options for seat positions, locations and/or adjustments. The customizable features may be programed and set by the user via the wireless device 130, as explained below.

The user interface 120 may include a system for receiving input and presenting output for the vehicle and user association management system 110. In an aspect, the user interface 120 may include a computer display (e.g., a screen) and speakers for output and touch input, buttons, dials, keyboard, or other features for input. The user interface 120 may be integrated with a vehicle infotainment system. In an aspect, a user may select a menu option or press a dedicated button to access and interact with the vehicle and user association management system 110. The user interface 120 may allow the user to input personal information to identify the user. For instance, the personal information may be a personal e-mail address, name, date of birth, address, a PIN, etc.

The term "screen," "display screen," "computer display" or "display," as used herein, may include, but are not limited to, eidophor, electroluminescent display ("ELD"), electronic paper, e-Ink, gyricon, light emitting diode ("LED"), cathode ray tube ("CRT"), liquid-crystal display ("LCD"), plasma display panel ("PDP"), digital light processing ("DLP"), and the like.

The communications interface 122 (e.g., wireless modem) may provide wired or wireless computer communications utilizing various protocols to send/receive electronic signals internally with respect to features and systems within the vehicle 102 and with respect to external devices (e.g., wireless device 130 and association management service 150). These protocols may include a wireless system utilizing radio-frequency (RF) communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. Additionally, the communications interface 122 of the vehicle 102 may be operably connected for internal computer communication via a bus (e.g., a MAY or a LIN protocol bus) to facilitate data input and output between the ECU 112 and vehicle features and systems.

The wireless device 130 may include any device capable of wireless communication with the vehicle and user association management system 110, the vehicle 102 and the association management service 150. In an aspect, the wireless device 130 may include a processor 132, a memory 134, a wireless interface 136, a user interface 138 and an application 140. The processor 132 may execute computer executable instructions stored in memory 134. In another aspect, the application 140 may include a set of instructions stored in memory 134 that are executed by the processor 132.

The term "vehicle application" or "application," as used herein, may refer to any software run by the vehicle and user association management system 110 and/or wireless device 130, which may provide information or data to a user, or may receive information or data from a user. The applications may be displayed on a screen and may include, but are not limited to, navigation, radio, telephone, settings, electric charging, status information, cameras, web browsers, e-mail, games, utilities, remote start, customizable features, and the like.

The wireless interface 136 may provide wireless computer communications utilizing various protocols to send/ receive electronic signals with respect to external devices (e.g., vehicle 102 and association management service 150). These protocols may include a wireless system utilizing radio-frequency (RF) communications (e.g., IEEE 802.11 (Wi-Fi), IEEE 802.15.1 (Bluetooth®)), a near field communication system (NFC) (e.g., ISO 13157), a wireless local area network (WLAN), a wireless wide area network (WWAN) (e.g., cellular) and/or a point-to-point system. The user interface 138 may include a system for receiving input and presenting output for the wireless device 130. In an aspect, the user interface 138 may include a display (e.g., a screen) and speakers for output and a touch input, buttons, dials, keyboard, or other features for input. In another aspect, the wireless device 130 may be a smart phone including a touch screen for input and output.

In an aspect, the application 140 may be a user installed application operating in conjunction with the vehicle 102 and/or the association management service 150. For example, the manufacturer of the vehicle 102 or the provider of the association management service 150 may provide the application 140 to users of the vehicle 102 (e.g., through a digital distribution service). The application 140 may be stored in the memory 134 and executed by the processor 132. In an aspect, when the application 140 receives a notification, e.g., a push notification, from the association management service 150 and/or the vehicle 102, the application 140 may display an approval or authorization request. In an aspect, the approval or authorization request may be confirmed by a user through the application 140, by ratifying the notification. Application 140 may provide the user, via the screen, a notification requesting the user to confirm registration and association, with the vehicle 102. When the notification has been ratified, the application 140 may store a token or other security device/record in the memory 134 received from the association management service 150. In accordance with one aspect, the token may be a two-factor authentication security device that may be used to authorize the use of computer services. The use of tokens by the vehicle and the wireless device along with the authorization process, is explained in detail in connection with FIGS. 2, 3A and 3B.

In an aspect, the application 140 may be an e-mail client providing the notification to the user. The notification may be an e-mail requesting that the user provide additional personal information, complete a registration process and/or to install an additional application (e.g., through a digital distribution service). In one aspect, the user may receive an e-mail requesting that the user register for the association management service 150, and requiring additional information, for instance, an address, first name, last name, date of birth, and the like. Upon completion of the registration process, the user may be prompted to install the additional application. The registration process is explained in detail below.

In another aspect, the application 140 may store personal customization options available for associated vehicle 102. Further, the application 140 may store the user selected customization options in memory 134. The application 140 may receive input/output via user interface 138. Additionally, the application 140 may communicate with external devices via wireless interface 136. In one aspect, the application 140 may directly communicate with the vehicle and the vehicle and user association management system 110 to receive communications and send selected customization options, as explained below in connection with FIG. 2. The application 140 may also communicate with the association management service 150 to relay and store information related to the vehicle and user association management system 110.

The association management service 150 may be a remote service that provides association information to the vehicle 102 and/or wireless device 130. The association management service 150 may be a cloud service that is hosted by one or more computer servers or virtual servers. The association management service 150 may coordinate the associations between users, vehicles and wireless devices. In an aspect, the association management service 150 may register a vehicle 102 based on a unique identifier such as a vehicle identification number (VIN) or an identifier of the communications interface 122. The association management service 150 may register a user based on the wireless device 130. The association management service 150 may store information regarding the user, for example, e-mail address, address, name, date of birth, etc., to be used for the registration process. The registration process is explained in detail below in connection with FIG. 3B.

In an aspect, the association management service 150 may establish an association between a specific vehicle 102 and one or more registered users based on the wireless devices 130. In an aspect, the association management service 150 may perform an authentication process when establishing an association between a registered wireless device 130 of a user and the vehicle 102, to ensure that the wireless device 130 is authorized to access options for the vehicle 102. The authentication process is explained in detail below in connection with FIGS. 2 and 3A. In an additional aspect, the association management service 150 may store a mapping of associations, i.e., vehicles to wireless devices of specific users, based on tokens. In another aspect, the association management service 150 may perform a registration process prior to establishing an association between a registered wireless device 130 of the user and the vehicle 102, to ensure that the wireless device 130 is registered before authorizing access to additional options for the vehicle 102.

In operation, the vehicle and user association management system 110 may receive input from a user via the user interface 120, comprising personal data, such as the e-mail address of the user. The vehicle and user association management system 110 may transmit the personal data via the communication interface 122 to the association management service 150 to continue the authentication/registration process. The authentication/registration processes are explained in more detail below in connection with FIG. 2.

Figure 2:
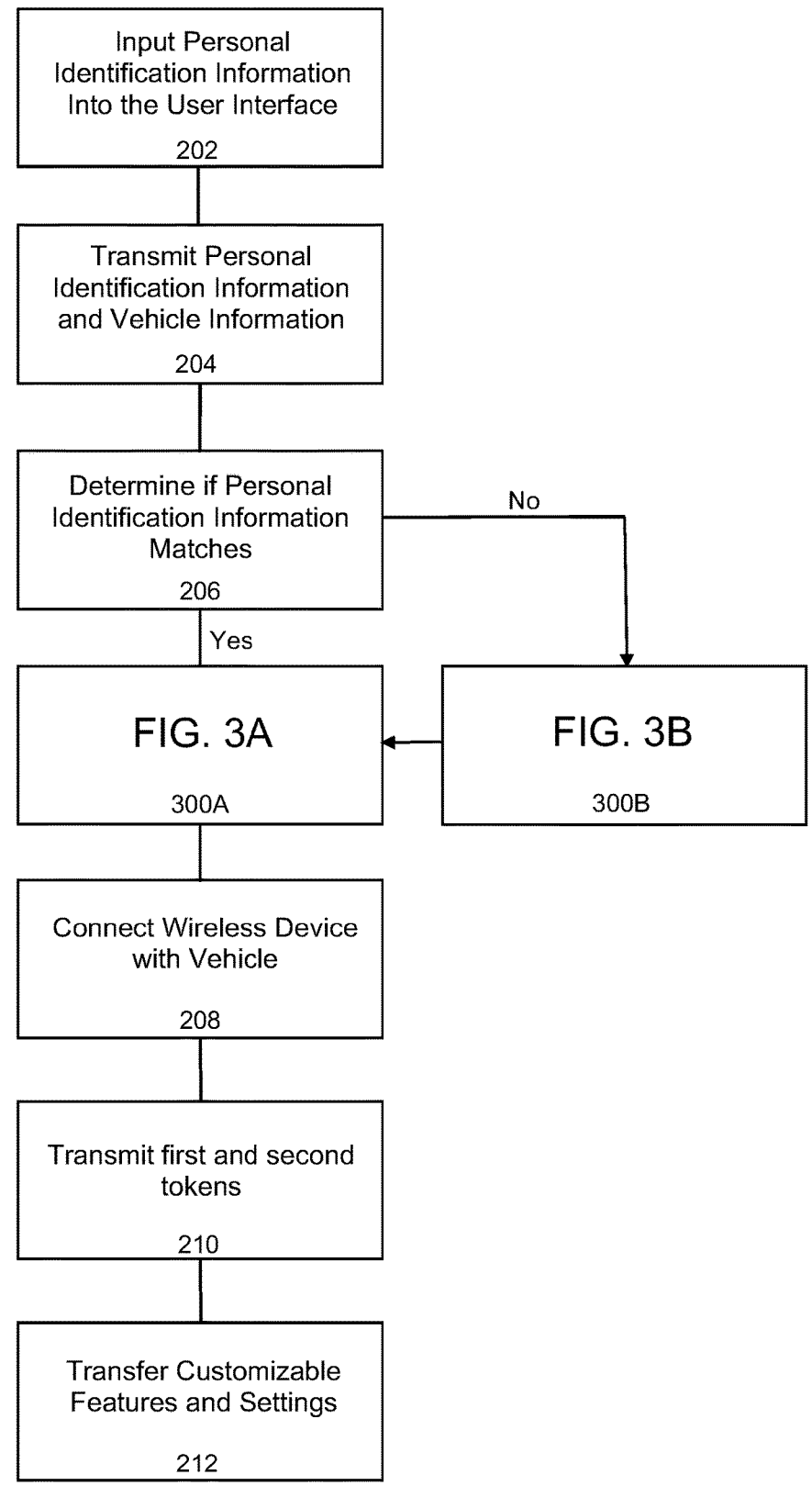
FIG. 2 illustrates a flowchart of an example method for establishing an association between a vehicle and a user according to one aspect of the disclosure.

Referring now to FIG. 2, which is described in conjunction with the example operating environment 100 of FIG. 1, an example method 200 for establishing an association between the vehicle 102 and the user of a wireless device 130.

In block 202, the method 200 may include a user inputting personal identification information into the user interface 120 of a vehicle 102. As described above, the personal identification information may be the e-mail address of the user. In an aspect, the user may input XXX@email.com, thereby identifying the user to the vehicle and user association management system 110.

In block 204, the vehicle and user association management system 110 may transmit, via communication interface 122, the entered personal identification information, along with information pertaining to the vehicle 102 to the association management service 150. In an aspect, the transmission may include XXX@email.com along with the VIN of the vehicle. In block 206, the association management service 150, may receive the transmission from the communications interface 122. Additionally, when the association management service 150 receives the personal identification information, the association management service 150 determines if the personal identification information matches any previously stored personal identification information. In an aspect, association management service 150 receives XXX@email.com and compares the received data to determine if XXX@gmail.com has been previously stored. If the association management service 150 determines that the received personal identification information does not match previously stored date, the method proceeds to block 300B. Block 300B, corresponding to FIG. 3B will be described in detail below. If the association management service 150 determines that the received personal identification information matches previously stored data, the method proceeds to block 300A, corresponding to FIG. 3A.

Figure 3A:
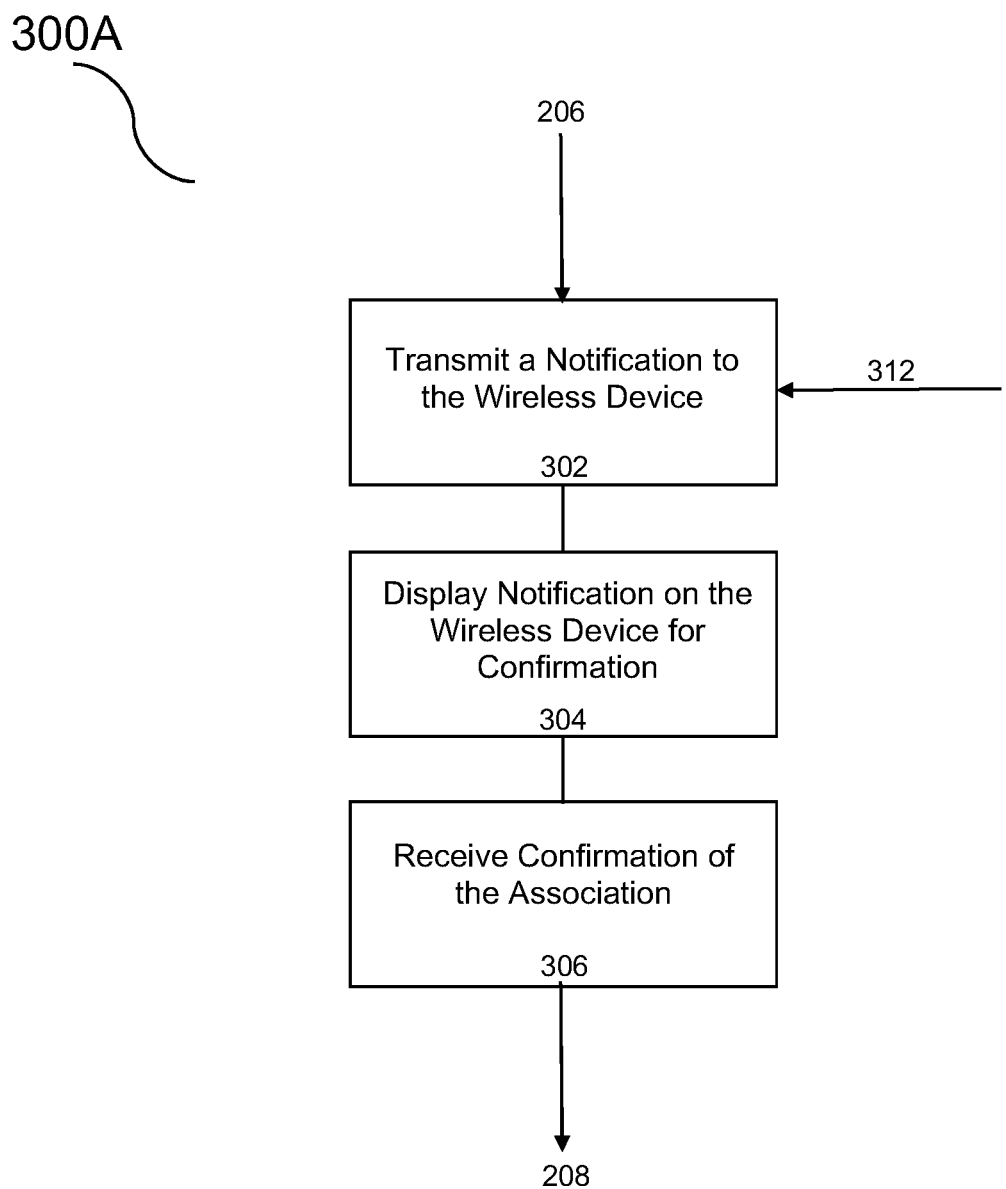
FIG. 3A illustrates a flowchart of an example method for an authentication process for a vehicle and user association according to one aspect of the disclosure.

Referring now to FIG. 3A, which is described in conjunction with both the example operating environment 100 of FIG. 1 and example method 200 of FIG. 2, therein shown is an example method 300A for an authentication process for establishing an association between the vehicle 102 and the user of a wireless device 130.

In block 302, the method 300A, if the association management service 150 determines that the received personal identification information matches previously stored data, the method may include transmitting a notification to the wireless device 130, via the application 140. The application 140 may be pre-loaded in the memory 134 of the wireless device 130. In an aspect, the association management service 150 may transmit a push notification to the wireless device 130 of the user. The wireless device 130 may display the notification on the user interface 138.

In block 304, the user interface 138 may display a notification informing the user of wireless device 130 that a vehicle authentication process has been initiated. The notification may ask for confirmation to continue the authentication process. In one aspect, the notification may require the user to confirm the association between the vehicle 102 and the wireless device 130. In another aspect, the user interface 138, may display a push notification stating "please confirm that you are the owner of 2018 vehicle ABC." The user of the wireless device 130 may either confirm or deny the authentication process. If the user confirms the authentication process, the wireless device transmits a confirmation to the association management service 150. If the user denies the authentication process, the process may terminate.

In block 306, the association management service 150, may receive the confirmation of the association between the vehicle 102 and the user of wireless device 130. This association may be stored in the association management service 150. Additionally, in an aspect, the association between the vehicle 102 and the wireless device 130 may be deleted at a future time based upon either removal of the vehicle (e.g., sale or other disposal of the vehicle) or the wireless device (e.g., lost wireless device, replacement wireless device). When confirmation of the association is received by the association management service 150, the association management service 150 transmits corresponding tokens to the vehicle 102 and the wireless device 130. The corresponding tokens may be stored in the memory 116 of the vehicle 102 and the method 134 of the wireless device 130. Additionally, an association has been established between the vehicle 102, the wireless device 130 and the user have for purposes of the association management service 150.

In another aspect, the storage of tokens in the respective devices ensures user data is not stored by either the vehicle 102 or the wireless device 130. In an aspect, the personal identification information, entered in block 202 of FIG. 2, may not be stored in the vehicle and thus not susceptible to data breach. The implementation and use of the corresponding tokens is discussed below. After block 306, the method proceeds back to block 208 of FIG. 2.

Figure 3B:
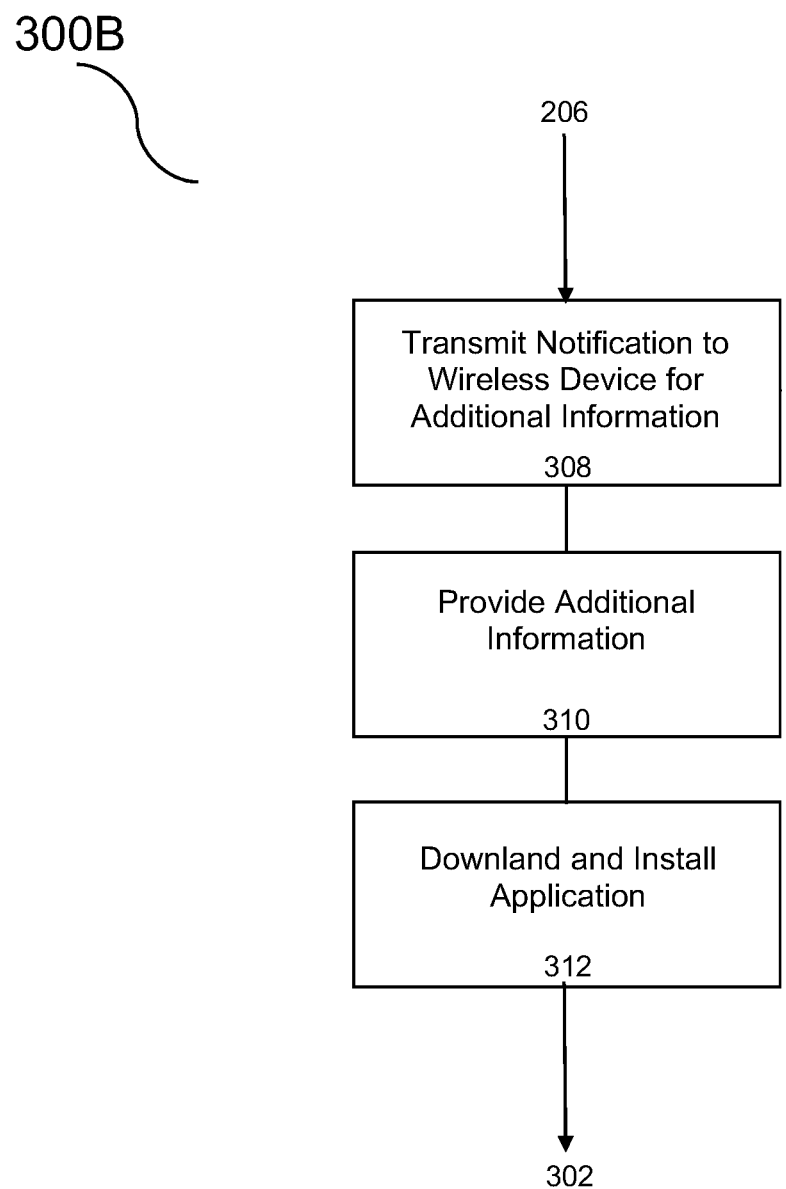
FIG. 3B illustrates a flowchart of an example method for a registration process for a vehicle and user association according to one aspect of the disclosure.

Referring now to FIG. 3B, which is described in conjunction with the example operating environment 100 of FIG. 1, the example method 200 of FIG. 2, and the example method 300A of FIG. 3A, therein shown is an example method for a registration process for establishing an association between the vehicle 102 and the user of a wireless device 130.

In block 308, the method 300B, if the association management service 150 determines that the received personal identification information does not match previously stored data, the method may include transmitting a notification to the user that further user information is required. In an aspect, based upon the personal identification provided by the user, e.g. personal e-mail address, the association management service 150 transmits a message to the user. In an aspect, the message may be in the form of an e-mail corresponding to the personal e-mail address input by the user. The user may access the e-mail message on any device configured to display e-mail messages. In an aspect, the e-mail message may provide a hyperlink or website directing the user to provide additional personal information to complete the registration process. As discussed above, the additional personal information may be first name, last name, address, date of birth, etc.

In block 310, the user provides the additional personal information to the association management service 150 by, for instance, a transmitted message (e.g., e-mail), a website, an application, a telephone call or text. The association management service 150 associates the original personal identification information, e.g., e-mail address, with the additional personal identification information and stores both in the memory. Further, the association management service 150 may transmit an additional message, e.g., an e-mail, a hyperlink, instructions or a website for the user to access and download an application.

In block 312, the user may download and install the application on the wireless device 130. The method proceeds to block 302 of FIG. 3A to complete the authentication process, as discussed above.

Referring back to FIG. 2, once the wireless device 130, the vehicle 102 and the user have established an association, the user may be provided access to the additional features and options discussed above. Further, the user may access the vehicle with the wireless device 130. Additionally, in one aspect, the user may access additional options on the wireless device, and lock and unlock the doors via the application 140. Further, the user may access the vehicle with the wireless device 130. Additionally, in one aspect, the user may access the additional options on the wireless device, and load personalized customization features, as described above. Further, in block 208, upon accessing and starting the vehicle 102, the wireless device 130 may connect directly with the vehicle, as described above via the wireless interface 136 and the communication interface 122. In an aspect, the wireless device may pair with the vehicle via a Bluetooth® or USB connection. Upon the direct connection of the wireless device 130 with the vehicle 102, the previously stored tokens may be transferred between devices. In another aspect, the token stored in vehicle 102, may be transferred to the wireless device 130. Additionally, for example, the token stored in wireless device 130 may be transferred to vehicle 102.

In block 210, either device, e.g., the vehicle 102 or the wireless device 103 may transfer the tokens to the association management service 150. In an aspect, if the wireless device 130 connects directly to vehicle 102, the token stored in the wireless device may be transferred to the vehicle, and the vehicle may transmit both tokens to the association management service 150. When the association management service 150 receives both tokens, the association management service 150 may compare the tokens to determine if an association between the vehicle and the wireless device has been established. If an association between the vehicle 102 and the wireless device 130 has been established, the association management service 150 may transmit an acknowledgement signal back to the transmission device. If an association between the vehicle 102 and the wireless device 130 has been established, the association management service 150 transmits a termination signal back to the transmission device. In an aspect, if the vehicle transmits both tokens to the association management service 150 for comparison, the vehicle may receive either the acknowledgement signal or the termination signal.

In block 212, upon receipt of the acknowledgement signal, customizable features and settings, described above, may be transferred between the wireless device 130 and the vehicle 102. In an aspect, when the acknowledgement signal is received, the wireless device 130 may transfer to the vehicle specific positions of the driver's seat previously set by the user via the application 140. Additionally, for example, the wireless device may transfer a predetermined list of radio stations set by the user via the application 140. Additionally, the vehicle 102 may implement the customizable features and settings transferred by the wireless device 130. Additionally, the customizable features and settings may be updated in real-time by the user via the application 140. Further, upon receipt of the termination signal, customizable features and settings may not be transferred between the wireless device 130 and the vehicle 102.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. An example of such a computer system 400 is shown in FIG. 4.

Figure 4:
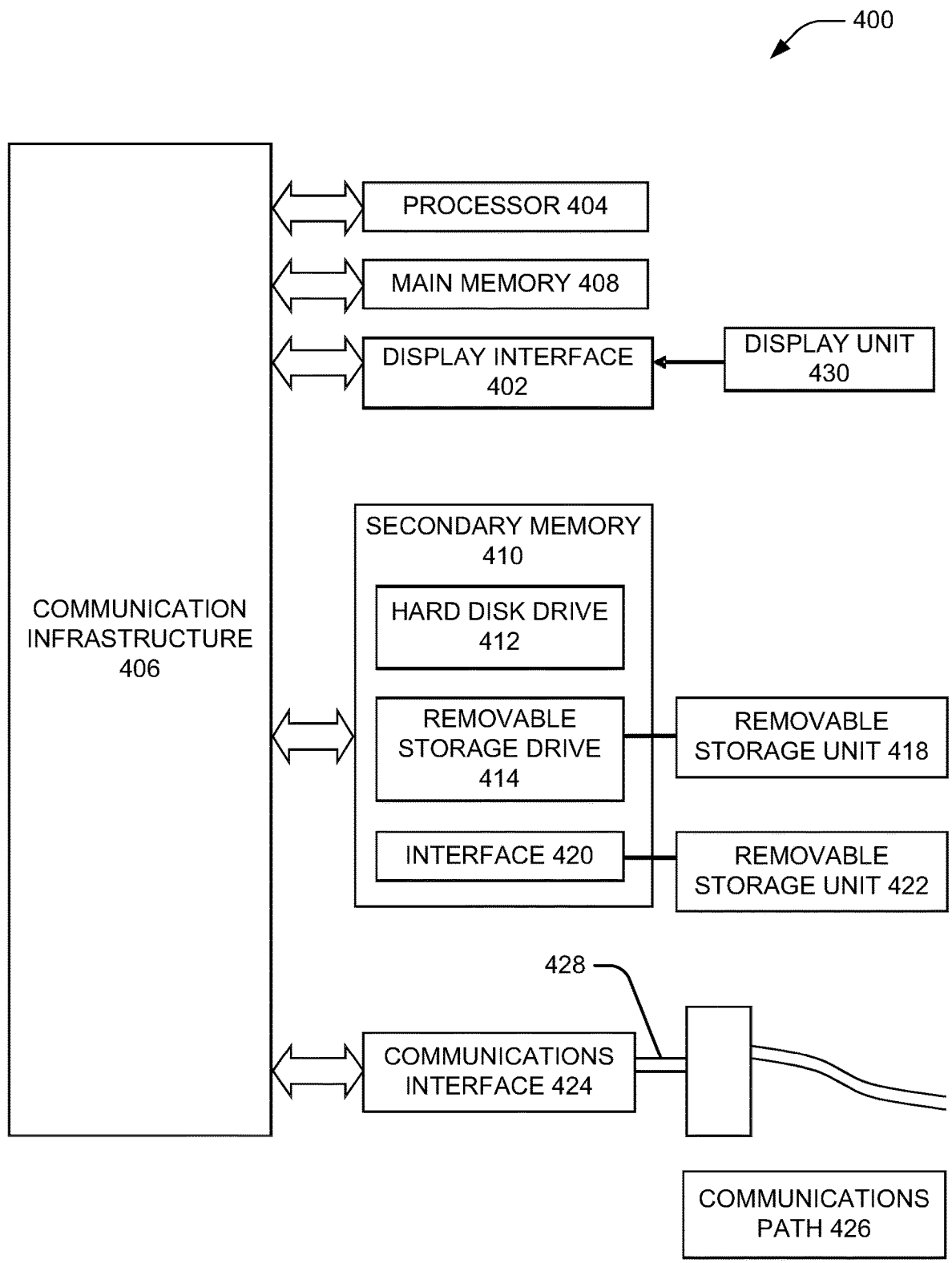
FIG. 4 presents an example system diagram of various hardware components and other features according to one aspect of the disclosure.

FIG. 4 presents an example system diagram of various hardware components and other features, for use in accordance with an aspect of the present disclosure. Aspects of the present disclosure may be implemented using hardware, software, or a combination thereof and may be implemented in one or more computer systems or other processing systems. In one example variation, aspects described herein may be directed toward one or more computer systems capable of carrying out the functionality described herein. An example of such a computer system 400 is shown in FIG. 4.

Computer system 400 includes one or more processors, such as processor 404. The processor 404 is connected to a communication infrastructure 406 (e.g., a communications bus, cross-over bar, or network). In one example, processor 120 may include processor 404. Various software aspects are described in terms of this example computer system. After reading this description, it will become apparent to a person skilled in the relevant art(s) how to implement aspects described herein using other computer systems and/or architectures.

Computer system 400 may include a display interface 402 that forwards graphics, text, and other data from the communication infrastructure 406 (or from a frame buffer not shown) for display on a display unit 430. Display unit 430 may include display 128, in one example. Computer system 400 also includes a main memory 408, preferably random access memory (RAM), and may also include a secondary memory 410. The secondary memory 410 may include a hard disk drive 412 and/or a removable storage drive 414, representing a floppy disk drive, a magnetic tape drive, an optical disk drive, etc. The removable storage drive 414 reads from and/or writes to a removable storage unit 418 in a well-known manner. Removable storage unit 418, represents a floppy disk, magnetic tape, optical disk, etc., which is read by and written to removable storage drive 414. As will be appreciated, the removable storage unit 418 includes a computer usable storage medium having stored therein computer software and/or data.

In alternative aspects, secondary memory 410 may include other similar devices for allowing computer programs or other instructions to be loaded into computer system 400. Such devices may include a removable storage unit 422 and an interface 420. Examples of such may include a program cartridge and cartridge interface (such as that found in video game devices), a removable memory chip (such as an erasable programmable read only memory (EPROM), or programmable read only memory (PROM)) and associated socket, and other removable storage units 422 and interfaces 420, which allow software and data to be transferred from the removable storage unit 422 to computer system 400. In an example, memory 116 and 134 may include one or more of main memory 408, secondary memory 410, removable storage drive 414, removable storage unit 418, removable storage unit 422, etc.

Computer system 400 may also include a communications interface 424. Communications interface 424 allows software and data to be transferred between computer system 400 and external devices. Examples of communications interface 424 may include a modem, a network interface (such as an Ethernet card), a communications port, a Personal Computer Memory Card International Association (PCMCIA) slot and card, etc. Software and data transferred via communications interface 424 are in the form of signals 428, which may be electronic, electromagnetic, optical or other signals capable of being received by communications interface 424. These signals 428 are provided to communications interface 424 via a communications path (e.g., channel) 426. This path 426 carries signals 428 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive, a hard disk installed in a hard disk drive, and/or signals 428. These computer program products provide software to the computer system 400. Aspects described herein may be directed to such computer program products. Communications interface 122 and wireless interface 136 may include communications interface 424.

Computer programs (also referred to as computer control logic) are stored in main memory 408 and/or secondary memory 410. Computer programs may also be received via communications interface 424. Such computer programs, when executed, enable the computer system 400 to perform various features in accordance with aspects described herein. In particular, the computer programs, when executed, enable the processor 404 to perform such features. Accordingly, such computer programs represent controllers of the computer system 400. Computer programs may include the vehicle and user association management system 110.

In variations where aspects described herein are implemented using software, the software may be stored in a computer program product and loaded into computer system 400 using removable storage drive 414, hard disk drive 412, or communications interface 420. The control logic (software), when executed by the processor 404, causes the processor 404 to perform the functions in accordance with aspects described herein as described herein. In another variation, aspects are implemented primarily in hardware using hardware components, such as application specific integrated circuits (ASICs). Implementation of the hardware state machine so as to perform the functions described herein will be apparent to persons skilled in the relevant art(s).

In yet another example variation, aspects described herein are implemented using a combination of both hardware and software.

Figure 5:
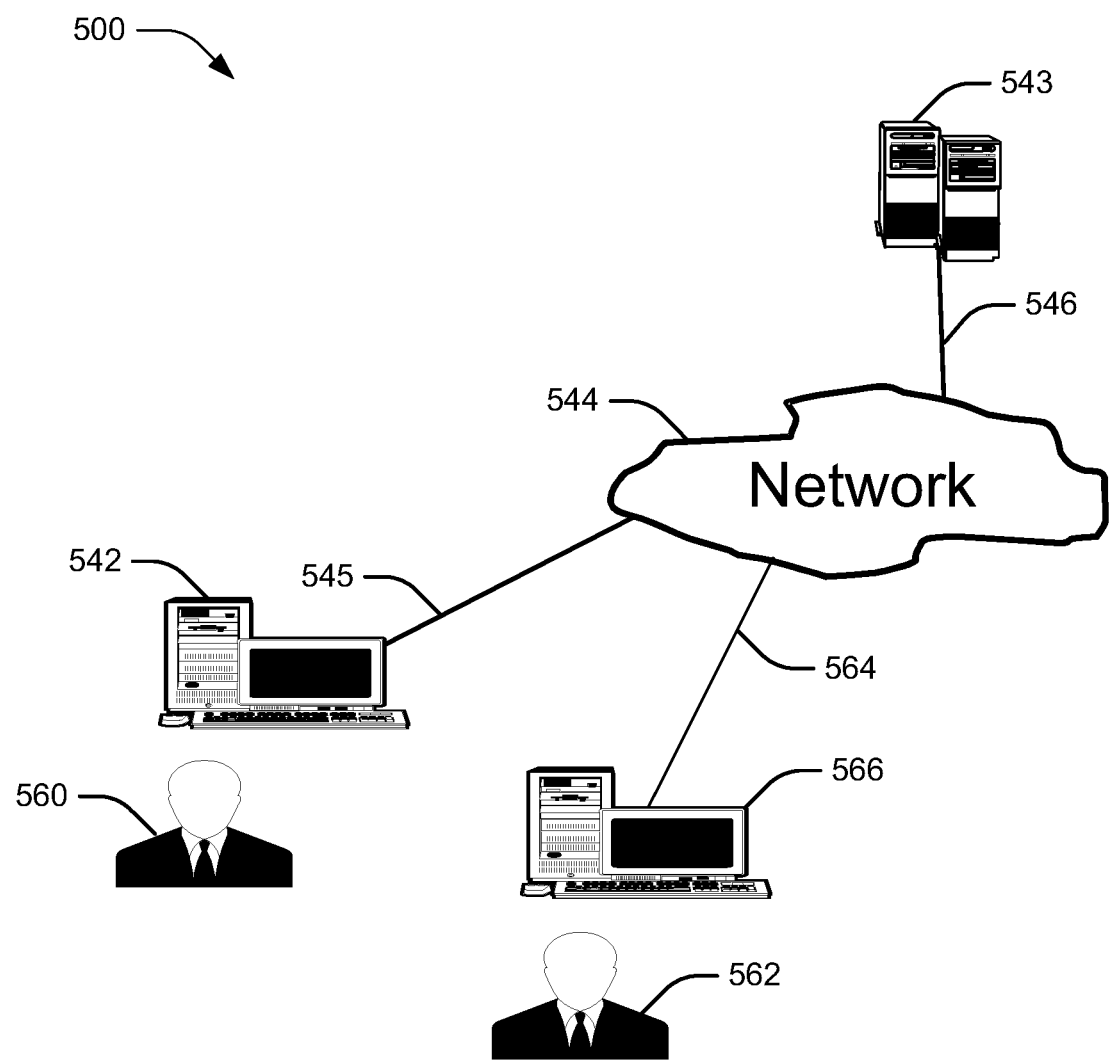
FIG. 5 is a block diagram of various example system components according to one aspect of the disclosure.

FIG. 5 is a block diagram of various example system components, in accordance with an aspect. FIG. 5 shows a communication system 500 usable in accordance with aspects described herein. The communication system 500 includes one or more accessors 560, 562 (also referred to interchangeably herein as one or more "users") and one or more terminals 542, 566. In one aspect, terminals 542, 566 may include vehicle 102 or a related system (e.g., the vehicle and user association management system 110, processor 114, communications device 122, etc.), and/or the like. In one aspect, data for use in accordance with aspects described herein is input and/or accessed by accessors 560, 562 via terminals 542, 566, such as personal computers (PCs), minicomputers, mainframe computers, microcomputers, telephonic devices, or wireless devices, such as personal digital assistants ("PDAs") or a hand-held wireless devices coupled to a server 543, such as a PC, minicomputer, mainframe computer, microcomputer, or other device having a processor and a repository for data and/or connection to a repository for data, via a network 544, such as the Internet or an intranet, and couplings 545, 546, 564. The couplings 545, 546, 564 include wired, wireless, or fiber optic links. In another example variation, the method and system in accordance with aspects described herein operate in a stand-alone environment, such as on a single terminal.

The aspects discussed herein may also be described and implemented in the context of computer-readable storage medium storing computer-executable instructions. Computer-readable storage media includes computer storage media and communication media. In one aspect, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

The definitions provided above through the specification include various examples and/or forms of components that fall within the scope of a term and that may be used for implementation. The examples provided above are not intended to be limiting.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method for establishing an association between a user and a vehicle comprising:
   receiving identification data corresponding to the user;
   transmitting the identification data to a server, wherein the identification data is compared to previously stored data in a memory of the server;
   when the identification data matches previously stored data, transmitting a notification to a mobile device of the user;
   when the identification data does not match previously stored data, transmitting a message based on the identification data, wherein the message prompts the user to complete a registration with the server;

establishing the association between the user and the vehicle based on at least one of the notification and the registration,
  wherein when the registration is complete, receiving a first token at the mobile device of the user and a second token at the vehicle,
  when a connection between the user and the vehicle is established, transferring the first token to the vehicle from the mobile device or transferring the second token to the mobile device from the vehicle;
  when both the first and second tokens are received by either the mobile device or the vehicle, transmitting both the first and second tokens by either the vehicle or the mobile device to the server; and
  comparing at the server the first and second tokens.

2. The method of claim 1, wherein the notification is a push notification from an application loaded on the mobile device, and the push notification is accepted by the user.

3. The method of claim 2, wherein, when the push notification is accepted by the user, receiving the first token at the mobile device and the second token at the vehicle.

4. The method of claim 3,
  wherein, based on the comparison, determining a positive correspondence between the first and second tokens, adjusting settings of the vehicle based upon preferences of the user.

5. The method of claim 1, wherein the registration comprises providing additional user information, and loading an application on the mobile device of the user.

6. The method of claim 5, further comprising:
  upon determining based on the comparison a correspondence between the first and second tokens, adjusting settings of the vehicle based upon preferences of the user.

7. A system comprising:
  a memory; and
  a processor coupled to the memory and configured to:
  receive identification data corresponding to a user;
  transmit the identification data to a server, wherein the identification data is compared to previously stored data in a memory of the server;
  a server configured to:
  when the identification data matches previously stored data, transmit a notification to a mobile device of the user;
  when the identification data does not match previously stored data, transmit a message based on the identification data, wherein the message prompts the user to complete a registration with the server;
  establish an association between the user and a vehicle based on at least one of the notification and the registration,
    wherein when the registration is complete, transmitting a first token to the mobile device of the user and a second token to the vehicle, and when a connection between the user and the vehicle is established, transferring the first token to the vehicle from the mobile device or transferring the second token to the mobile device from the vehicle;
    when both the first and second tokens are obtained by either the mobile device or the vehicle, receiving both the first and second tokens by either the vehicle or the mobile device; and
    compare the first and second tokens.

8. The system of claim 7, wherein the notification is a push notification from an application loaded on the mobile device, and the push notification is accepted by the user.

9. The system of claim 8, wherein, when the push notification is accepted by the user, receive the first token at the mobile device and the second token at the vehicle.

10. The system of claim 9, wherein the server is further configured to:
  upon determining based upon the comparison a correspondence between the first and second tokens, adjust settings of the vehicle based upon preferences of the user.

11. The system of claim 7, wherein the registration comprises providing additional user information, and loading an application on the mobile device of the user.

12. The system of claim 11, wherein the server is further configured to:
  upon determining based upon the comparison a correspondence between the first and second tokens, adjust settings of the vehicle based upon preferences of the user.

13. A non-transitory computer-readable storage medium containing executable computer program code, the code comprising instructions configured to cause a processor to:
  receive identification data corresponding to a user;
  transmit the identification data to a server, wherein the identification data is compared to previously stored data in a memory of the server;
  when the identification data matches previously stored data, transmit a notification to a mobile device of the user;
  when the identification data does not match previously stored data, transmit a message based on the identification data, wherein the message prompts the user to complete a registration with the server;
  establish an association between the user and a vehicle based on at least one of the notification and the registration,
    wherein when the registration is complete, receiving a first token at the mobile device of the user and a second token at the vehicle,
    when a connection between the user and the vehicle is established, transferring the first token to the vehicle from the mobile device or transferring the second token to the mobile device from the vehicle;
    when both the first and second tokens are received by either the mobile device or the vehicle, transmitting both the first and second tokens by either the vehicle or the mobile device to the server; and
    compare at the server the first and second tokens.

14. The non-transitory computer-readable storage medium of claim 13, wherein the notification is a push notification from an application loaded on the mobile device, and the push notification is accepted by the user.

15. The non-transitory computer-readable storage medium of claim 14, wherein, when the push notification is accepted by the user, receiving the first token at the mobile device and the second token at the vehicle.

16. The non-transitory computer-readable storage medium of claim 15, wherein the processor is further configured to:
  upon determining based on the comparison a correspondence between the first and second tokens, adjust settings of the vehicle based upon preferences of the user.

17. The non-transitory computer-readable storage medium of claim 13, wherein the registration comprises providing additional user information, and loading an application on the mobile device of the user.

\* \* \* \* \*